(No Model.)

L. W. CAMPBELL.
END CAP, TIE, AND SEAL FOR CYLINDRICAL COTTON BALES.

No. 535,751. Patented Mar. 12, 1895.

UNITED STATES PATENT OFFICE.

LOUIS WILBUR CAMPBELL, OF WACO, TEXAS.

END CAP, TIE, AND SEAL FOR CYLINDRICAL COTTON-BALES.

SPECIFICATION forming part of Letters Patent No. 535,751, dated March 12, 1895.

Application filed October 18, 1894. Serial No. 526,323. (No model.)

*To all whom it may concern:*

Be it known that I, LOUIS WILBUR CAMPBELL, a citizen of the United States, and a resident of the city of Waco, McLennan county, and State of Texas, have invented certain new and useful Improvements in Caps, Ties, and Seals for Cylindrical Cotton - Bales, of which the following is a specification.

My invention relates to an improved combined cap, tie, and seal for cylindrical cotton bales, and it consists of the certain novel arrangement and combination of parts hereinafter described and claimed.

Reference is had to the accompanying drawings, in which the same parts are indicated by the same letters throughout the several views.

Figure 1:
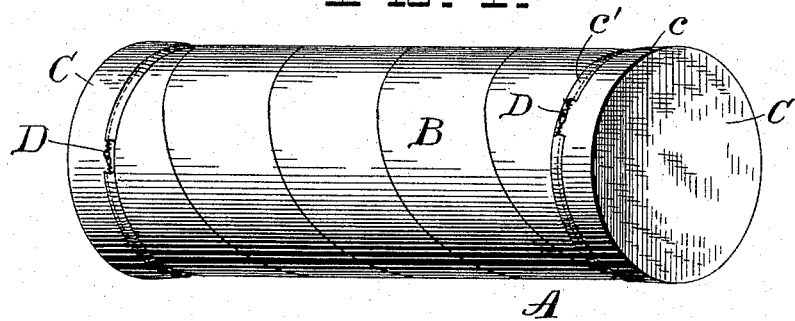
Figure 2:
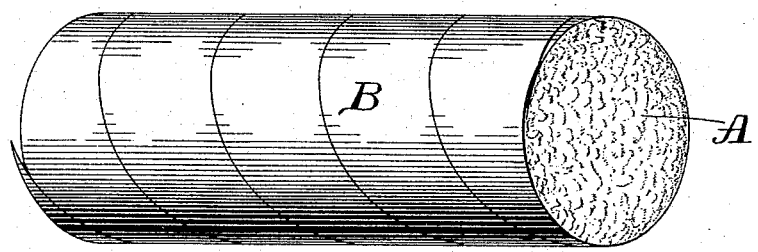
Figure 3:
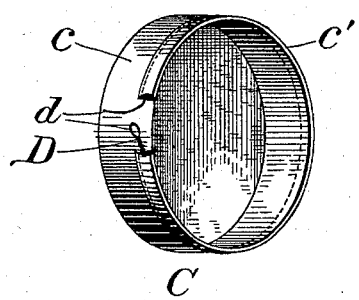

Figure 1 represents a perspective view of a cylindrical cotton bale, having the cylindrical portion thereof incased in a spiral wrapper, and the ends tied and covered by the improved cap. Fig. 2 represents a perspective view of the same bale before the two caps are put on, and Fig. 3 represents a perspective view of one of the caps detached from the bale.

A represents the bale.

B represents the spiral wrapping for the cylindrical portion of the bale which may be of any desired or well-known type.

C represents one of the caps, which has a flat top, and is bent over cylindrically as at c, the cylindrical portion being provided with a hem c', in which the wire D is inclosed. This hem does not extend completely around the cap, but leaves the two ends of the wire sticking out along a short portion of the side of the cap, as is shown in Figs. 1 and 3. One end of the wire is preferably provided with the loop d, through which the other end of the wire d' may be rove.

In use the cap is slipped over the end of the bale to the position shown in Fig. 1, and then the wire is drawn taut and the parts fastened together in any convenient way. Thus the end d' may be rove through the loop d, and the wire stretched taut and clinched with an ordinary pair of nippers. The function of the wire is not only to keep the cap on the end of the bale, and thus to prevent any moisture, or impurities from getting into the cotton, but its most important use is to bind the bale of cotton, like an ordinary cotton-tie, and incidentally to hold the spiral wrapping B firmly in place. Thus, the simple act of fastening the cap in place also effectually secures the bale of cotton against unwinding, and by the herein-described device the process of capping, tying, and sealing the cotton bale, are all performed in one operation.

Having thus described my invention, what I claim, and desire to secure by Letters Patent of the United States, is—

1. A combined cap, tie, and seal for cylindrical cotton bales, which consists of a cap provided with a flat end and turned over into an approximately cylindrical form at its edges, and having a hem in said edges, and a draw wire held in said hem, and projecting therefrom, substantially as and for the purposes described.

2. The combination with a cylindrical cotton bale, of a covering for the cylindrical portion thereof, extending nearly or quite to the ends of said bale, a cap having a flat face, and turned over edges adapted to slip over the end of the bale and to inclose the ends of said covering, and a draw-wire secured to the edge of said cap, and adapted to tie said cap and said covering on the bale, and also to serve as a tie to the cotton in said bale, substantially as and for the purposes described.

LOUIS WILBUR CAMPBELL.

Witnesses:
OSCAR WIEL,
WM. T. GOULD.